US012030747B2

(12) United States Patent
Yuzawa et al.

(10) Patent No.: US 12,030,747 B2
(45) Date of Patent: Jul. 9, 2024

(54) WORK MACHINE

(71) Applicant: SUMITOMO CONSTRUCTION MACHINERY CO., LTD., Tokyo (JP)

(72) Inventors: Yoshimitsu Yuzawa, Chiba (JP); Tsutomu Miyakawa, Chiba (JP); Minoru Okuyama, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 779 days.

(21) Appl. No.: 17/158,263

(22) Filed: Jan. 26, 2021

(65) Prior Publication Data

US 2021/0163267 A1 Jun. 3, 2021

Related U.S. Application Data

(63) Continuation of application No. PCT/JP2019/029280, filed on Jul. 25, 2019.

(30) Foreign Application Priority Data

Jul. 27, 2018 (JP) ................................ 2018-141350

(51) Int. Cl.

| | |
|---|---|
| ***B66C 1/06*** | (2006.01) |
| ***B66C 13/16*** | (2006.01) |
| ***E02F 9/26*** | (2006.01) |

(52) U.S. Cl.

CPC ................ *B66C 1/06* (2013.01); *B66C 13/16* (2013.01); *E02F 9/26* (2013.01)

(58) Field of Classification Search

CPC ... B66C 1/06; B66C 1/08; B66C 13/16; E02F 9/26; E02F 9/2246; B66F 9/182

USPC ........................................................ 294/65.5

See application file for complete search history.

(56) References Cited

U.S. PATENT DOCUMENTS

| | | | | |
|---|---|---|---|---|
| 3,339,652 A * | 9/1967 | Price | G01G 19/14 | 177/136 |
| 3,795,334 A * | 3/1974 | Ishida | H01F 7/206 | 414/737 |
| 4,237,455 A * | 12/1980 | Beckley | B66C 1/04 | 340/685 |
| 7,514,639 B2 * | 4/2009 | Heuer | G01G 19/18 | 177/184 |

(Continued)

FOREIGN PATENT DOCUMENTS

| | | |
|---|---|---|
| JP | H03-279195 | 12/1991 |
| JP | H11-349281 | 12/1999 |

(Continued)

OTHER PUBLICATIONS

English translation of Japanese patent JP 2014-001040 (Year: 2014).*

(Continued)

*Primary Examiner* — Dean J Kramer

(74) *Attorney, Agent, or Firm* — IPUSA, PLLC

(57) ABSTRACT

A work machine includes a lower traveling structure, an upper swing structure mounted on the lower traveling structure via a swing mechanism, an attachment attached to the upper swing structure, a lifting magnet attached to the attachment, a hardware processor configured to calculate the weight of an object lifted by the lifting magnet, and a display device configured to display the weight of the object calculated by the hardware processor.

8 Claims, 10 Drawing Sheets

(56) References Cited

U.S. PATENT DOCUMENTS

| | | | | |
|---|---|---|---|---|
| 7,848,861 | B2 * | 12/2010 | Pollock | B66C 1/08 700/83 |
| 8,491,025 | B2 * | 7/2013 | Pollock | B66C 1/08 414/606 |
| 9,464,409 | B2 * | 10/2016 | Magaki | E02F 9/26 |
| 10,604,382 | B2 | 3/2020 | Morimoto et al. | |
| 11,133,124 | B2 * | 9/2021 | Inkinen | H01F 7/206 |
| 2011/0301817 | A1 * | 12/2011 | Hobenshield | E02F 9/26 345/1.3 |
| 2017/0240387 | A1 * | 8/2017 | Morimoto | F01N 11/00 |
| 2018/0057319 | A1 | 3/2018 | Hirate et al. | |

FOREIGN PATENT DOCUMENTS

| | | |
|---|---|---|
| JP | 2006-078348 | 3/2006 |
| JP | 2006-112827 | 4/2006 |
| JP | 2007-045532 | 2/2007 |
| JP | 2007-204208 | 8/2007 |
| JP | 2008-007279 | 1/2008 |
| JP | 2009-202974 | 9/2009 |
| JP | 2010-037036 | 2/2010 |
| JP | 2011-068422 | 4/2011 |
| JP | 5051687 | 10/2012 |
| JP | 2014-001040 | 1/2014 |
| JP | 2014-198610 | 10/2014 |
| JP | 2015-209690 | 11/2015 |
| JP | 2016-193789 | 11/2016 |
| JP | 2017-019635 | 1/2017 |
| WO | 2016/076271 | 5/2016 |

OTHER PUBLICATIONS

International Search Report for PCT/JP2019/029280 mailed on Sep. 3, 2019.

* cited by examiner

WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/029280, filed on Jul. 25, 2019 and designating the U.S., which claims priority to Japanese patent application No. 2018-141350, filed on Jul. 27, 2018. The entire contents of the foregoing applications are incorporated herein by reference.

BACKGROUND

Technical Field

The present disclosure relates to work machines with a lifting magnet.

Description of Related Art

A work machine with a lifting magnet has been known. This work machine includes a display device installed in a cabin. The display device is configured to display information on the remaining amount of an aqueous urea solution.

SUMMARY

According to an aspect of the present invention, a work machine includes a lower traveling structure, an upper swing structure mounted on the lower traveling structure via a swing mechanism, an attachment attached to the upper swing structure, a lifting magnet attached to the attachment, a hardware processor configured to calculate the weight of an object lifted by the lifting magnet, and a display device configured to display the weight of the object calculated by the hardware processor.

DETAILED DESCRIPTION

The related-art work machine does not display information on an object lifted with the lifting magnet. Therefore, an operator of the work machine may be unable to know the weight of the object lifted with the lifting magnet.

In view of the above, it is desired to provide a work machine that makes it possible for its operator to know the weight of an object lifted with a lifting magnet.

According to an aspect of the present invention, a work machine that makes it possible for its operator to know the weight of an object lifted with a lifting magnet is provided.

Figure 1:
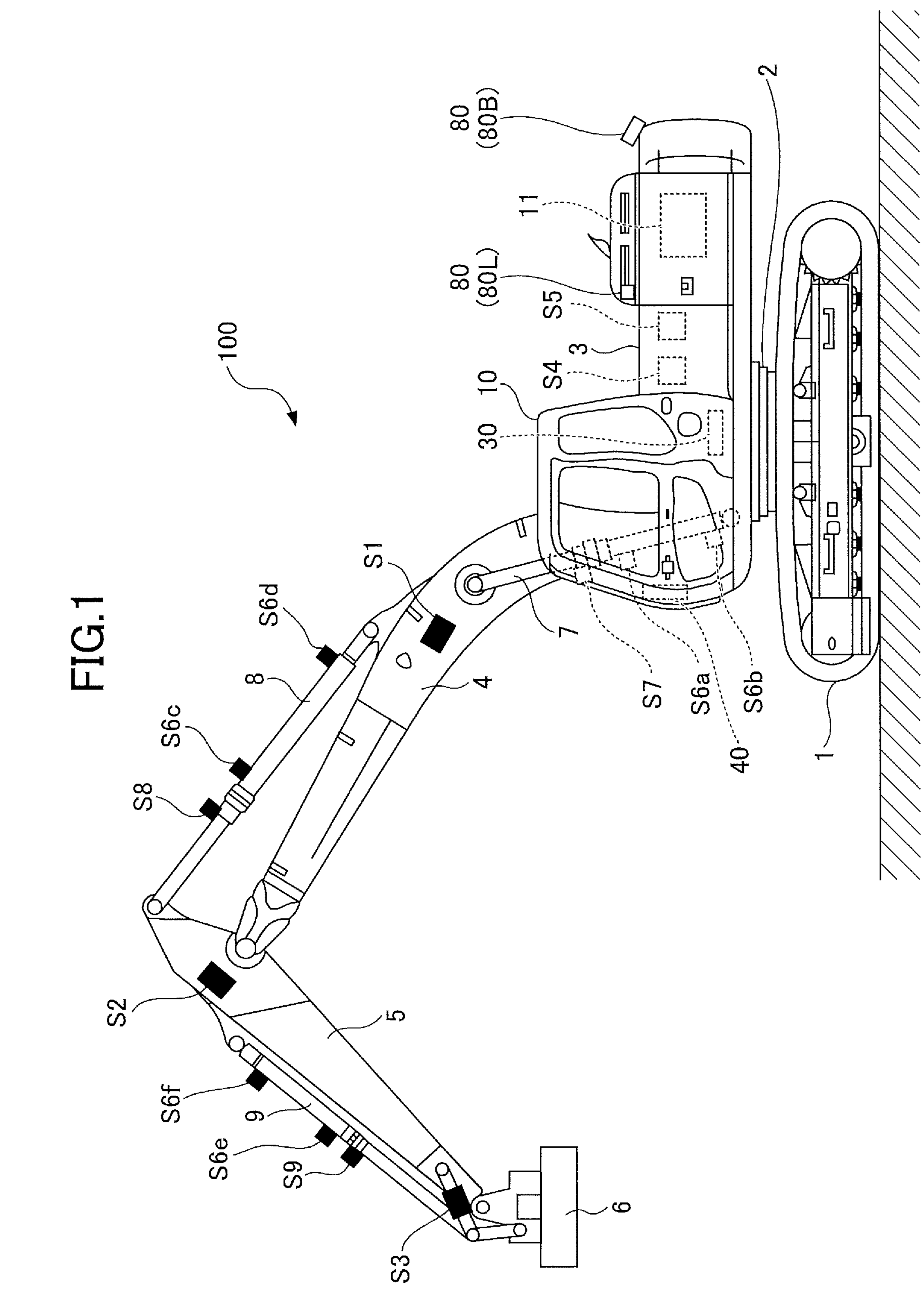
FIG. 1 is a side view of a work machine according to an embodiment of the present invention.

FIG. 1 is a side view of a work machine 100 according to an embodiment of the present invention. An upper swing structure 3 is mounted on a lower traveling structure 1 of the work machine 100 via a swing mechanism 2. A boom 4 is attached to the upper swing structure 3. An arm 5 is attached to the distal end of the boom 4. A lifting magnet 6 serving as an end attachment is attached to the distal end of the arm 5. The boom 4 and the arm 5 constitute a working attachment that is an example of an attachment. The boom 4 is driven by a boom cylinder 7. The arm 5 is driven by an arm cylinder 8. The lifting magnet 6 is driven by a lifting magnet cylinder 9.

A boom angle sensor S1 is attached to the boom 4. An arm angle sensor S2 is attached to the arm 5. A lifting magnet angle sensor S3 is attached to the lifting magnet 6. A controller 30, a display device 40, an image capturing device 80, a machine body tilt sensor S4, and a swing angular velocity sensor S5 are attached to the upper swing structure 3. Instead of the image capturing device 80 or separately from the image capturing device 80, an object detector may be attached to the upper swing structure 3.

The boom angle sensor S1 is configured to detect a boom angle that is the rotation angle of the boom 4 relative to the upper swing structure 3. The boom angle sensor S1 may be, for example, a rotation angle sensor that detects the rotation angle of the boom 4 about a boom foot pin, a cylinder stroke sensor that detects the amount of stroke of the boom cylinder 7 (boom stroke amount), a tilt (acceleration) sensor that detects the tilt angle of the boom 4, or the like, or may also be a combination of an acceleration sensor and a gyroscope. The same is true for the arm angle sensor S2, which detects an arm angle that is the rotation angle of the arm 5 relative to the boom 4, and the lifting magnet angle sensor S3, which detects a lifting magnet angle that is the rotation angle of the lifting magnet 6 relative to the arm 5.

The machine body tilt sensor S4 is configured to detect the tilt of the upper swing structure 3 (machine body tilt angle). According to this embodiment, the machine body tilt sensor S4 is an acceleration sensor that detects the tilt angle of the upper swing structure 3 about its longitudinal axis and lateral axis relative to a horizontal plane. The longitudinal axis and lateral axis of the upper swing structure 3, for example, pass through a machine central point that is a point on the swing axis of the work machine 100, crossing each other at right angles.

The swing angular velocity sensor S5 is configured to detect the swing angular velocity of the upper swing structure 3. According to this embodiment, the swing angular velocity sensor S5 is a gyroscope. The swing angular velocity sensor S5 may also be a resolver, a rotary encoder, or the like.

The image capturing device 80 is configured to capture an image of an area surrounding the work machine 100. The image capturing device 80 is, for example, a monocular camera, a stereo camera, a distance image camera, an infrared camera, a LIDAR, or the like. According to the example of FIG. 1, the image capturing device 80 includes a back camera 80B attached the back end of the upper surface of the upper swing structure 3, a left camera 80L attached at the left end of the upper surface of the upper swing structure 3, and a right camera 80R (not visible in FIG. 1) attached at the right end of the upper surface of the upper swing structure 3.

The object detector is configured to detect an object in an area surrounding the work machine 100. The object detector includes a back sensor that monitors a space behind the work machine 100, a left sensor that monitors a space to the left of the work machine 100, and a right sensor that monitors a space to the right of the work machine 100. The object detector may also include a front sensor that monitors a space in front of the work machine 100. Each of the back camera, the left camera, and the right camera is, for example, a LIDAR, a millimeter wave radar, a stereo camera, or the like.

In the case of detecting an object using the output of the image capturing device 80, the controller 30, for example, performs various kinds of image processing on an image captured by the image capturing device 80 and then detects the object using a known image recognition technique. The image capturing device 80 may include a front camera that captures an image of a space in front of the work machine 100.

A pressure sensor S6*a*, a pressure sensor S6*b*, and a boom cylinder stroke sensor S7 may be attached to the boom cylinder 7. A pressure sensor S6*c*, a pressure sensor S6*d*, and an arm cylinder stroke sensor S8 may be attached to the arm cylinder 8. A pressure sensor S6*e*, a pressure sensor S6*f*, and a lifting magnet cylinder stroke sensor S9 may be attached to the lifting magnet cylinder 9.

The pressure sensor S6*a* detects the pressure of the rod-side oil chamber of the boom cylinder 7. The pressure sensor S6*b* detects the pressure of the bottom-side oil chamber of the boom cylinder 7 (hereinafter "boom bottom pressure"). The pressure sensor S6*c* detects the pressure of the rod-side oil chamber of the arm cylinder 8. The pressure sensor S6*d* detects the pressure of the bottom-side oil chamber of the arm cylinder 8. The pressure sensor S6*e* detects the pressure of the rod-side oil chamber of the lifting magnet cylinder 9. The pressure sensor S6*f* detects the pressure of the bottom-side oil chamber of the lifting magnet cylinder 9.

A cabin 10 serving as a cab is provided and a power source such as an engine 11 is mounted on the upper swing structure 3.

Figure 2:
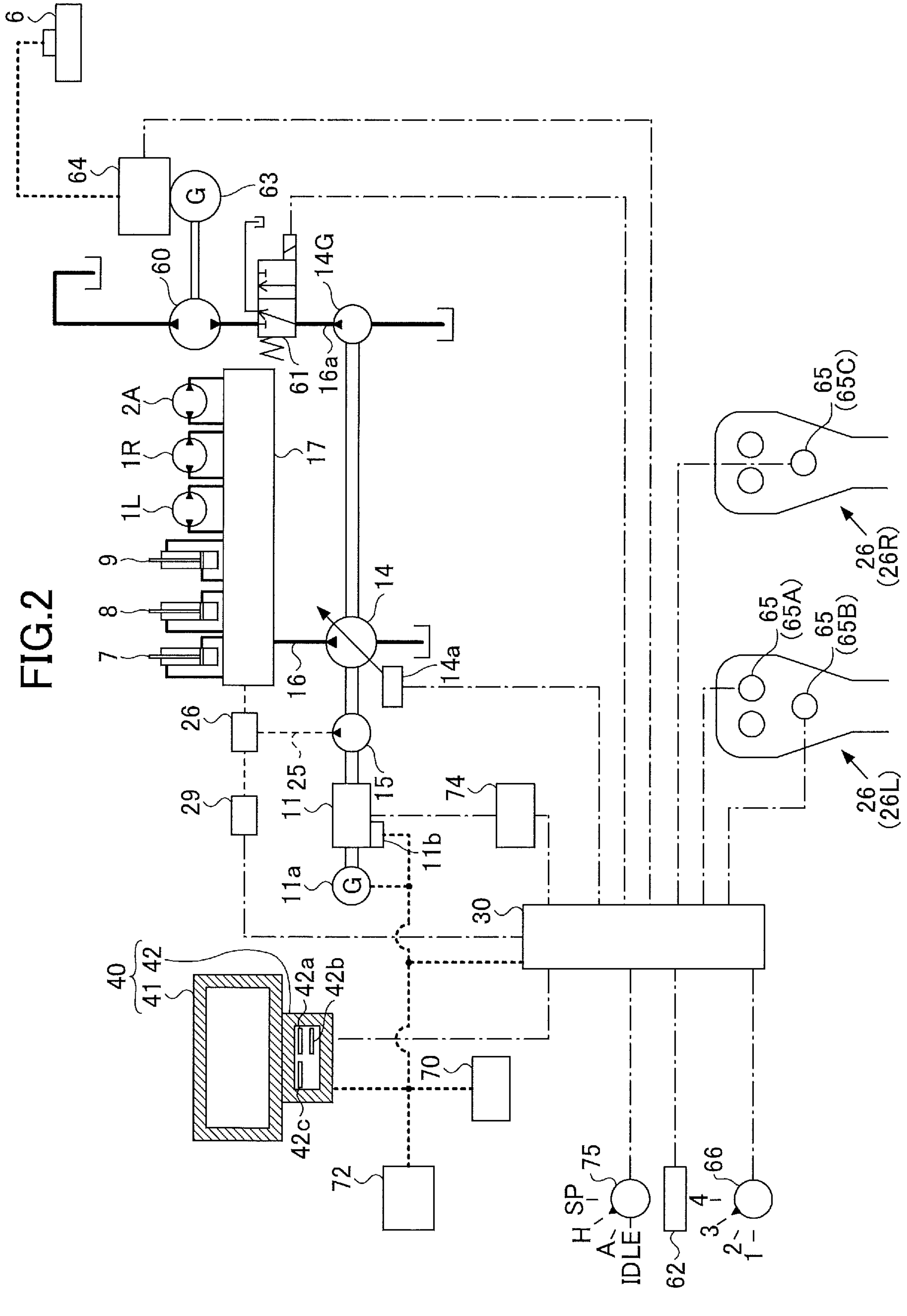
FIG. 2 is a block diagram illustrating an example configuration of a drive system installed in the work machine illustrated in FIG. 1.

FIG. 2 is a diagram illustrating an example configuration of a drive system installed in the work machine 100. In FIG. 2, a mechanical power transmission line, a hydraulic oil line, a pilot line, an electric control line, and an electric drive line are indicated by a double line, a thick solid line, a dashed line, a one-dot chain line, and a thick dotted line, respectively.

The drive system of the work machine 100 is constituted mainly of the engine 11, a main pump 14, a hydraulic pump 14G, a pilot pump 15, a control valve unit 17, an operating device 26, the controller 30, and an engine control unit 74.

The engine 11 is a power source of the work machine 100, and is, for example, a diesel engine that operates in such a manner as to maintain a predetermined rotational speed. The output shaft of the engine 11 is connected to each of the input shafts of an alternator 11*a*, the main pump 14, the hydraulic pump 14G, and the pilot pump 15.

The main pump 14 supplies hydraulic oil to the control valve unit 17 via a hydraulic oil line 16. According to this embodiment, the main pump 14 is a swash plate variable displacement hydraulic pump.

A regulator 14*a* is configured to control the discharge quantity of the main pump 14. According to this embodiment, the regulator 14*a* controls the discharge quantity of the main pump 14 by adjusting the swash plate tilt angle of the main pump 14 according to a control signal or the like from the controller 30.

The pilot pump 15 is configured to supply hydraulic oil to various hydraulic control devices including the operating device 26 via a pilot line 25. According to this embodiment, the pilot pump 15 is a fixed displacement hydraulic pump. The pilot pump 15, however, may be omitted. In this case, the function carried by the pilot pump 15 may be implemented by the main pump 14. That is, the main pump 14 may have the function of supplying hydraulic oil to the operating device 26, etc., after reducing the pressure of the hydraulic oil with a throttle or the like, apart from the function of supplying hydraulic oil to the control valve unit 17.

The control valve unit 17 is a hydraulic control device that controls a hydraulic system in the work machine 100. The control valve unit 17, for example, selectively supplies hydraulic oil discharged by the main pump 14 to one or more of the boom cylinder 7, the arm cylinder 8, the lifting magnet cylinder 9, a left travel hydraulic motor 1L, a right travel hydraulic motor 1R, and a swing hydraulic motor 2A. In the following description, the boom cylinder 7, the arm cylinder 8, the lifting magnet cylinder 9, the left travel hydraulic motor 1L, the right travel hydraulic motor 1R, and the swing hydraulic motor 2A are collectively referred to as "hydraulic actuators."

The operating device 26 is a device that an operator uses to operate the hydraulic actuators. According to this embodiment, the operating device 26 generates a pilot pressure by suppling hydraulic oil from the pilot pump 15 to a pilot port of a corresponding flow control valve in the control valve unit 17. Specifically, the operating device 26 includes a left operating lever for swing operation and arm operation, a right operating lever for boom operation and lifting magnet operation, travel pedals, and travel levers (none of which is depicted). The pilot pressure changes according to the operation details (including, for example, the direction of operation and the amount of operation) of the operating device 26.

An operating pressure sensor 29 is configured to detect a pilot pressure generated by the operating device 26. According to this embodiment, the operating pressure sensor 29 detects a pilot pressure generated by the operating device 26 and outputs the detection value to the controller 30. The controller 30 determines the individual operation details of the operating device 26 based on the output of the operating pressure sensor 29.

The controller 30 is a control device that executes various operations. According to this embodiment, the controller 30 is a microcomputer including a CPU, a volatile storage, and a nonvolatile storage. The controller 30, for example, reads programs corresponding to various functions from the nonvolatile storage, loads the programs into the volatile storage, and causes the CPU to execute processes corresponding to the programs.

The hydraulic pump 14G is configured to supply hydraulic oil to a hydraulic motor 60 via a hydraulic oil line 16*a*. According to this embodiment, the hydraulic pump 14G is a fixed displacement hydraulic pump and supplies hydraulic oil to the hydraulic motor 60 through a selector valve 61.

The selector valve 61 is configured to switch the flow of hydraulic oil discharged by the hydraulic pump 14G. According to this embodiment, the selector valve 61 is a solenoid valve whose valve position switches in response to a control command from the controller 30. The selector valve 61 has a first valve position to connect the hydraulic pump 14G and the hydraulic motor 60 and a second valve position to disconnect the hydraulic pump 14G and the hydraulic motor 60.

When a mode change switch 62 is operated so that the operating mode of the work machine 100 is changed to a lifting magnet mode, the controller 30 outputs a control signal to the selector valve 61, the controller 30 outputs control signal to the selector valve 61 to switch the selector valve 61 to the first valve position.

Furthermore, when the mode change switch 62 is operated so that the operating mode of the work machine 100 is changed to other than the lifting magnet mode, the controller 30 outputs control signal to the selector valve 61 to switch the selector valve 61 to the second valve position. FIG. 2 illustrates that the selector valve 61 is in the second valve position.

The mode change switch 62 is a switch to change the operating mode of the work machine 100, and is a rocker switch installed in the cabin 10 according to this embodiment. The operator operates the mode change switch 62 to choose between a shovel mode and the lifting magnet mode. The shovel mode is a mode in the case of causing the work machine 100 to operate as an excavator (shovel), and is selected, for example, when a bucket is attached to the distal end of the arm 5 instead of the lifting magnet 6. The lifting magnet mode is a mode in the case of causing the work machine 100 to operate as a work machine with a lifting magnet, and is selected when the lifting magnet 6 is attached to the distal end of the arm 5. The controller 30 may automatically change the operating mode of the work machine 100 based on the outputs of various sensors.

When the lifting magnet mode is selected, the selector valve 61 is set to the first valve position to cause hydraulic oil discharged by the hydraulic pump 14G to flow into the hydraulic motor 60. When an operating mode other than the lifting magnet mode is selected, the selector valve 61 is set to the second valve position to cause hydraulic oil discharged by the hydraulic pump 14G to flow out to a hydraulic oil tank without flowing into the hydraulic motor 60.

The rotating shaft of the hydraulic motor 60 is mechanically coupled to the rotating shaft of a generator 63. The generator 63 is configured to generate electric power for magnetizing the lifting magnet 6. According to this embodiment, the generator 63 is an alternator that operates in response to a control command from a power controller 64.

The power controller 64 is configured to control the supply and interruption of electric power for magnetizing the lifting magnet 6. According to this embodiment, the power controller 64 controls the start and stop of generation of alternating-current power by the generator 63 in response to a generation start command and a generation stop command from the controller 30. The power controller 64 is configured to convert the alternating-current power generated by the generator 63 into direct-current power and supply the direct-current power to the lifting magnet 6. The power controller 64 can control the magnitude of voltage applied to the lifting magnet 6 and the magnitude of electric current flowing through the lifting magnet 6.

When a lifting magnet switch 65 is operated to turn on, the controller 30 outputs an attraction command to the power controller 64. In response to receiving the attraction command, the power controller 64 converts the alternating-current power generated by the generator 63 into direct-current power and supply the direct-current power to the lifting magnet 6 to magnetize the lifting magnet 6. The energized lifting magnet 6 is in an attracting state to be ready to attract an object (magnetic body).

Furthermore, when the lifting magnet switch 65 is operated to turn off, the controller 30 outputs a release command to the power controller 64. In response to receiving the release command, the power controller 64 causes the generator 63 to stop generating power to turn the lifting magnet 6 in the attracting state into a non-attracting state (releasing state). The releasing state of the lifting magnet 6 means that the supply of electric power to the lifting magnet 6 is stopped so that the electromagnetic force generated by the lifting magnet 6 has disappeared.

The lifting magnet switch 65 is a switch to switch attraction and release of the lifting magnet 6. According to this embodiment, the lifting magnet switch 65 includes a weak magnetization button 65A and a strong magnetization button 65B serving as push-button switches provided at the top of a left operating lever 26L and a release button 65C serving as a push-button switch provided at the top of a right operating lever 26R.

The weak magnetization button 65A is an example of an input device for applying a predetermined first voltage to the lifting magnet 6 to cause the lifting magnet 6 to be in the attraction state (weak attraction state). The predetermined first voltage is, for example, a voltage set through a magnetic force control dial 66.

The strong magnetization button 65B is an example of an input device for applying a predetermined second voltage to the lifting magnet 6 to cause the lifting magnet 6 to be in the attraction state (strong attraction state). The predetermined second voltage is a voltage higher than the predetermined first voltage. The predetermined second voltage is, for example, a maximum allowable voltage.

The release button 65C is an example of an input device for causing the lifting magnet 6 to be in the releasing state.

The magnetic force control dial 66 is a dial for controlling the magnetic force (attraction force) of the lifting magnet 6. According to this embodiment, the magnetic force control dial 66 is installed in the cabin 10 and is configured to allow the magnetic force (attraction force) of the lifting magnet 6 when the weak magnetization button 65A is pressed to be selected from four levels. Specifically, the magnetic force control dial 66 is configured to allow the magnetic force (attraction force) of the lifting magnet 6 to be selected from the four levels of a first level through a fourth level. FIG. 2 illustrates that the third level is selected by the magnetic force control dial 66.

The lifting magnet 6 is, for example, controlled in such a manner as to generate a magnetic force (attraction force) of a level set by the magnetic force control dial 66. The magnetic force control dial 66 outputs data indicating the level of the magnetic force (attraction force) to the controller 30.

This configuration enables the operator to cause the lifting magnet 6 to attract and release an object (magnetic body) with fingers while operating the working attachment, operating the left operating lever 26L with the left hand and operating the right operating lever 26R with the right hand. Typically, the operator causes the lifting magnet 6 to attract an object (for example, scrap iron or the like) by pressing the weak magnetization button 65A while keeping the lifting magnet 6 in contact with the scrap iron. Thereafter, the operator slowly raises the boom 4 to lift the lifting magnet 6 attracting the scrap iron, and then increases the magnetic force (attraction force) of the lifting magnet 6 by pressing the strong magnetization button 65B. This is for preventing the scrap iron from falling from the lifting magnet 6 while being carried by an attachment operation (an operation including at least one of a boom operation, an arm operation, and a lifting magnet operation) or a swing operation.

Furthermore, the operator can sort objects by controlling the magnetic force (attraction force) of the lifting magnet 6 with the magnetic force control dial 66. The operator can, for example, sort out relatively light objects from relatively heavy objects by selectively lifting the relatively light objects from a scrap pile using a magnetic force (attraction force) of a relatively weak level, and moving the relatively light objects. This is because the operator can prevent the relatively heavy objects from being lifted by using a magnetic force (attraction force) of a relatively weak level.

The work machine 100 may also be configured to automatically change the operating mode to a speed limit mode in response to the pressing of the weak magnetization button 65A or the strong magnetization button 65B. The speed limit mode is, for example, an example of the lifting magnet mode, and is an operating mode that limits a swing speed and the driving speed of the attachment.

Furthermore, the work machine 100 may also automatically change the state of the lifting magnet 6 to a strong attraction state that is a state when the strong magnetization button 65B is pressed, when a predetermined operation is performed or a predetermined state occurs after the weak magnetization button 65A is pressed. The predetermined operation is, for example, a swing operation. The predetermined state is, for example, a state where the attachment is in a predetermined pose, specifically, a state where the boom angle is a predetermined angle. In this case, the work machine 100 can automatically change the state of the lifting magnet 6 to the strong attraction state without the strong magnetization button 65B being pressed when, for example, a swing operation is performed after the lifting magnet 6 caused to be in the weak attraction state by the pressing of the weak magnetization button 65A is lifted in response to a boom raising operation.

The display device 40 is a device to display various kinds of information. According to this embodiment, the display device 40 is fixed to the front right pillar (not depicted) of the cabin 10 in which an operator seat is provided. Furthermore, as illustrated in FIG. 2, the display device 40 can provide the operator with information on the work machine 100 by displaying the information on an image display part 41. Furthermore, the display device 40 includes an operation part 42 serving as an input device. The operator can input various commands to the controller 30 using the operation part 42.

The operation part 42 is a panel including various switches. According to this embodiment, the operation part 42 includes a light switch 42*a*, a windshield wiper switch 42*b*, and a windshield washer switch 42*c* serving as hardware buttons. The light switch 42*a* is a switch for turning on and off lights attached to the exterior of the cabin 10. The windshield wiper switch 42*b* is a switch for moving and stopping a windshield wiper. The windshield washer switch 42*c* is a switch for spraying windshield washer fluid.

The display device 40 is configured to be supplied with electric power from a rechargeable battery 70 to operate. The rechargeable battery 70 is configured to be charged with electric power generated in the alternator 11*a*. The electric power of the rechargeable battery 70 is also supplied to the controller 30, electrical equipment 72 other than the display device 40, etc. A starter lib of the engine 11 is driven with electric power from the rechargeable battery 70 to start the engine 11.

The engine control unit 74 is configured to control the engine 11. According to this embodiment, the engine control unit 74 collects various data indicating the condition of the engine 11 and transmits the collected data to the controller 30. The engine control unit 74 and the controller 30, which are configured as separate bodies, may be configured as a unit. For example, the engine control unit 74 may be integrated into the controller 30.

An engine rotational speed adjustment dial 75 is a dial for adjusting the engine rotational speed. According to this embodiment, the engine rotational speed adjustment dial 75 is installed in the cabin 10 and is configured to allow the engine rotational speed to be selected from four levels. Specifically, the engine rotational speed adjustment dial 75 is configured to allow the engine rotational speed to be selected from the four levels of SP mode, H mode, A mode, and idling mode. FIG. 2 illustrates that the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the work machine 100 with low noise while prioritizing fuel efficiency, and uses the third highest engine rotational speed. The idling mode is a rotational speed mode selected when it is desired to idle the engine 11, and uses the lowest engine rotational speed (idling rotational speed).

The engine 11 is controlled in such a manner as to maintain an engine rotational speed corresponding to a rotational speed mode set by the engine rotational speed adjustment dial 75. The engine rotational speed adjustment dial 75 outputs data indicating the setting of the engine rotational speed to the controller 30.

Figure 3:
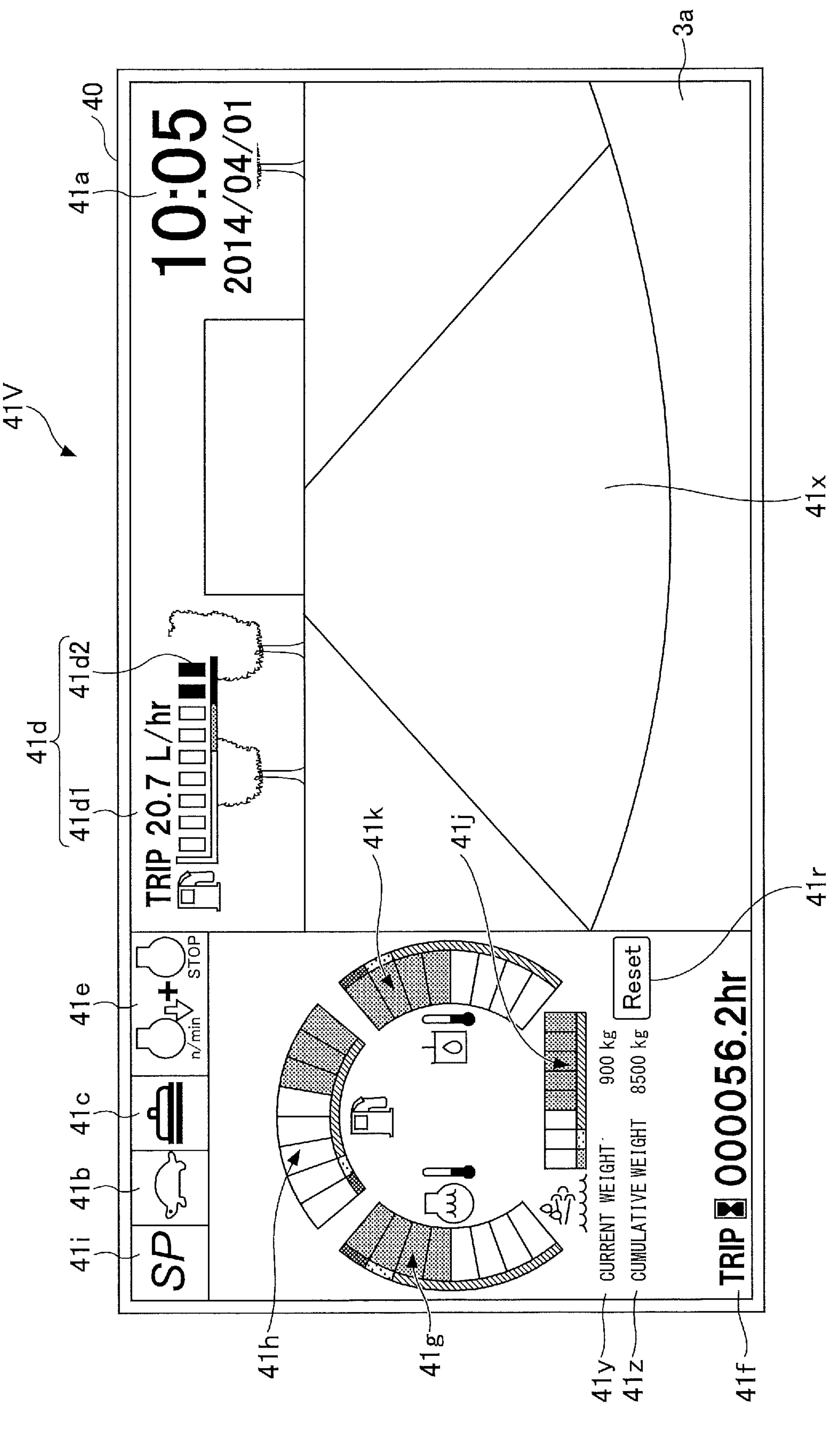
FIG. 3 is a diagram illustrating an example configuration of a main screen.

Next, an example configuration of a main screen 41V displayed on the display device 40 is described with reference to FIG. 3. The main screen 41V of FIG. 3 is displayed on the image display part 41 when, for example, the operating mode is the lifting magnet mode.

The main screen 41V includes a date and time display area 41*a*, a travel mode display area 41*b*, an attachment display area 41*c*, a fuel efficiency display area 41*d*, an engine control status display area 41*e*, an engine operating time display area 41*f*, a coolant water temperature display area 41*g*, a remaining fuel amount display area 41*h*, a rotational speed mode display area 41*i*, a remaining aqueous urea solution amount display area 41*j*, a hydraulic oil temperature display area 41*k*, a reset button 41*r*, a camera image display area 41*x*, a current weight display area 41*y*, and a cumulative weight display area 41*z*.

The travel mode display area 41*b*, the attachment display area 41*c*, the engine control status display area 41*e*, and the rotational speed mode display area 41*i* are areas for displaying settings information that is information on the settings of the work machine 100. The fuel efficiency display area 41*d*, the engine operating time display area 41*f*, the coolant water temperature display area 41*g*, the remaining fuel amount display area 41*h*, the remaining aqueous urea solution amount display area 41*j*, the hydraulic oil temperature display area 41*k*, the current weight display area 41*y*, and the cumulative weight display area 41*z* are areas for displaying operating state information that is information on the operating state of the work machine 100.

Specifically, the date and time display area 41*a* is an area for displaying a current date and time. The travel mode display area 41*b* is an area for displaying a current travel mode. The attachment display area 41*c* is an area for displaying an image that represents a currently attached end attachment. FIG. 3 illustrates that an image representing the lifting magnet 6 is displayed.

The fuel efficiency display area 41*d* is an area for displaying fuel efficiency information calculated by the controller 30. The fuel efficiency display area 41*d* includes an average fuel efficiency display area 41*d*1 for displaying a lifelong average fuel efficiency or section average fuel efficiency and an instantaneous fuel efficiency display area 41*d*2 for displaying instantaneous fuel efficiency.

The engine control status display area 41*e* is an area for displaying the control status of the engine 11. The engine operating time display area 41*f* is an area for displaying the cumulative operating time of the engine 11. The coolant water temperature display area 41*g* is an area for displaying the current temperature condition of engine coolant water. The remaining fuel amount display area 41*h* is an area for displaying the state of the remaining amount of fuel stored in a fuel tank. The rotational speed mode display area 41*i* is an area for displaying a current rotational speed mode set with the engine rotational speed adjustment dial 75. The remaining aqueous urea solution amount display area 41*j* is an area for displaying the state of the remaining amount of an aqueous urea solution stored in an aqueous urea solution tank. The hydraulic oil temperature display area 41*k* is an area for displaying the state of the temperature of hydraulic oil in the hydraulic oil tank.

The camera image display area 41*x* is an area for displaying an image captured by the image capturing device 80. According to the example of FIG. 3, the camera image display area 41*x* displays a back camera image captured by the back camera 80B. The back camera image is a backward image showing a space behind the work machine 100 and includes a counterweight image 3*a*.

The current weight display area 41*y* is an area for displaying the weight of an object currently lifted by the lifting magnet 6 (hereinafter "current weight"). FIG. 3 illustrates that the current weight is 900 kg.

The controller 30 calculates the current weight based on, for example, the pose of the working attachment, the boom bottom pressure, and the specifications (weight, position of the center of gravity, etc.,) of the working attachment recorded in advance. Specifically, the controller 30 calculates the current weight based on the outputs of information obtaining devices such as the boom angle sensor S1, the arm angle sensor S2, the lifting magnet angle sensor S3, and the pressure sensor S6*b*.

The cumulative weight display area 41*z* is an area for displaying the cumulative value of the weights of objects lifted by the lifting magnet 6 during a predetermined period (hereinafter "cumulative weight"). FIG. 3 illustrates that the cumulative weight is 8500 kg. The weight of an object lifted by the lifting magnet 6 is added each time the release button 65C is pressed, for example.

The predetermined period is, for example, a period that starts when the reset button 41*r* is pressed. For example, in the case of loading scrap iron into the bed of a dump truck, the operator presses the reset button 41*r* to reset the cumulative weight each time a dump truck to be loaded changes, for example. This is for making it possible to easily understand the total weight of scrap iron loaded into each dump truck.

This configuration makes it possible to prevent scrap iron that exceeds the maximum loading capacity of a dump truck from being loaded into the bed of the dump truck. When it is detected by weight measurement using a truck scale that scrap iron that exceeds the maximum loading capacity is loaded, an operator of the dump truck has to return to a loading yard to unload part of the scrap iron loaded into the bed. The work machine 100 can prevent the occurrence of such work of adjusting a loading weight.

The predetermined period may be, for example, a period from the start time to the end time of a day's work. This is for enabling the operator or a manager to be easily aware of the total amount of scrap iron carried by a day's work.

The reset button 41*r* is a software button for resetting the cumulative weight. The reset button 41*r* may also be a hardware button placed at the operation part 42, the left operating lever 26L, the right operating lever 26R, or the like.

The controller 30 may also be configured to automatically recognize a change of dump trucks to automatically reset the cumulative weight. In this case, the controller 30 may recognize a change of dump trucks using an image captured by the image capturing device 80 or may recognize a change of dump trucks using a communications device.

Furthermore, the controller 30 may also be configured to add the current weight after recognizing that scrap iron lifted with the lifting magnet 6 has been loaded into the bed of a dump truck based on an image captured by the image capturing device 80. This is for preventing scrap iron conveyed to a location other than the bed of the dump truck from being added as scrap iron loaded in the dump truck.

The controller 30 may determine, based on the posture of the working attachment, whether scrap iron lifted with the lifting magnet 6 has been loaded into the bed of a dump truck. Specifically, the controller 30 may determine that scrap iron has been loaded into the bed of a dump truck when the height of the lifting magnet 6 exceeds a predetermined value (for example, the height of the bed of the dump truck) and the release button 65C is pressed, for example.

The controller 30 may be configured to output an alarm in response to determining that the current weight exceeds a predetermined value. The predetermined value is, for example, a value based on a rated lifting capacity. The alarm may be a visual alarm, an aural alarm or a tactile alarm. This configuration enables the controller 30 to inform the operator that the current weight has exceeded or may exceed a predetermined value.

In the case of lifting small scrap such as scrap iron, the work machine 100 is prevented from excessively increasing the current weight because the volume of scrap attracted to the lifting magnet 6 is limited. In the case of lifting a relatively large object such as an iron plate or a lump of iron, however, the work machine 100 may lift such an excessively heavy object that the degree of stability SV of the work machine 100 falls below a predetermined value (for example, 1.0). The degree of stability SV of the work machine 100 is expressed as $SV=(W2\times L2)/(W1\times L1)$, where W1 is the weight of the working attachment (including the weight of a lifted object), L1 is a horizontal distance from a tipping fulcrum to the center of gravity of the working attachment, W2 is the weight of the machine body of the work machine 100 (excluding the weight of the working attachment), and L2 is a horizontal distance from the tipping fulcrum to the center of gravity of the machine body.

When an excessively heavy object is lifted, the controller 30 may sound a buzzer and display an image showing that the current weight has exceeded a predetermined value on the display device 40. Therefore, the controller 30 can prevent the excessively heavy object from remaining lifted without going unnoticed by the operator. As a result, the controller 30 can increase the safety of work with the work machine 100.

Figure 4:
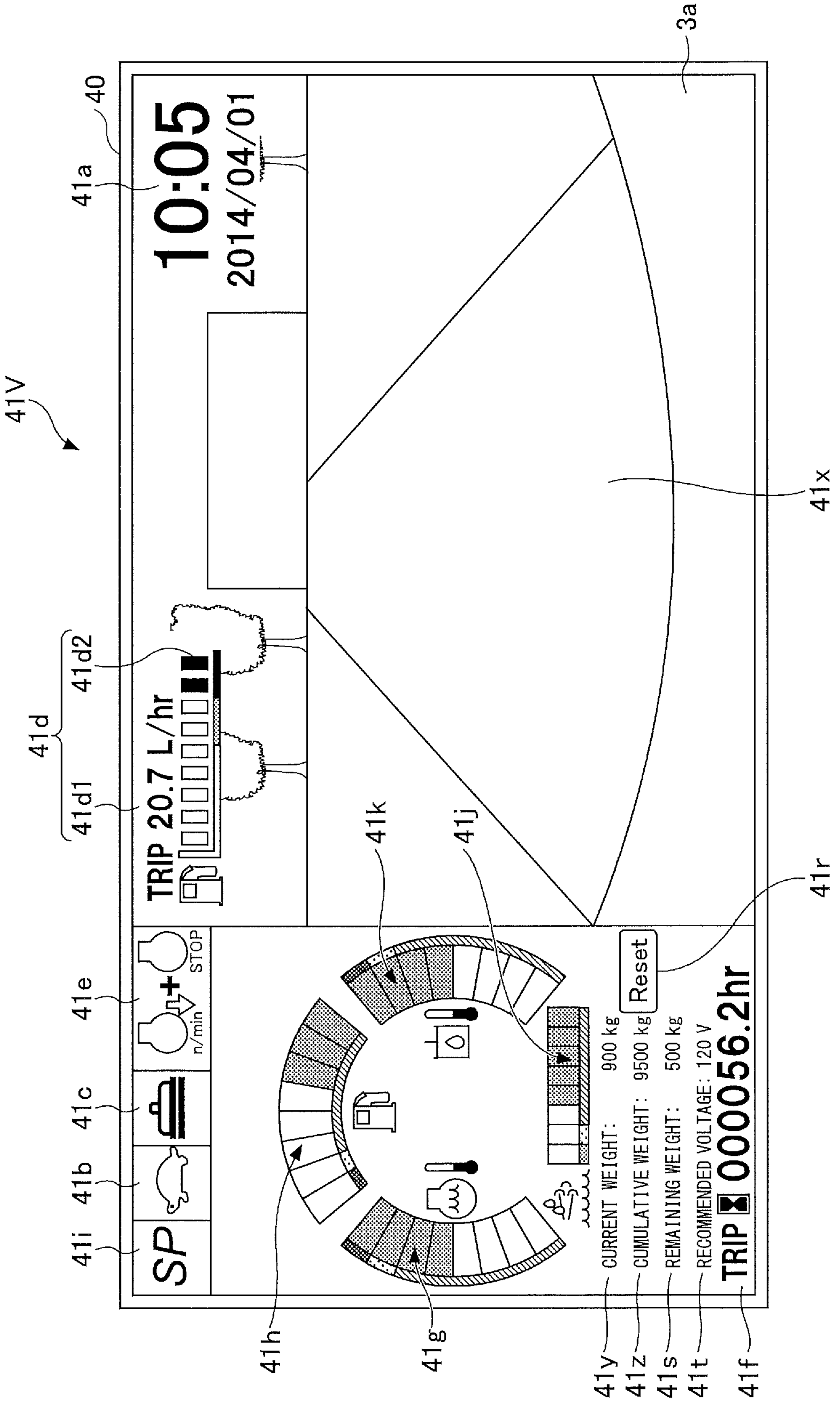
FIG. 4 is a diagram illustrating another example configuration of the main screen.

Next, another example configuration of the main screen 41V displayed on the display device 40 is described with reference to FIG. 4. The main screen 41V of FIG. 4 is different in including a remaining weight display area 41*s* and a recommended setting display area 41*t* from, but otherwise equal to, the main screen 41V of FIG. 3. Therefore, a description of a common portion is omitted and differences are described in detail.

The remaining weight display area 41*s* is an area for displaying a remaining weight that is the difference between a predetermined target weight and the current weight or the cumulative weight. The predetermined target weight is, for example, the maximum loading capacity of a dump truck. FIG. 4 illustrates that the cumulative weight is 9,500 kg and the remaining weight is 500 kg, namely, that the target weight is 10,000 kg. The display device 40, however, may display the target weight without displaying the remining weight or may display the target weight separately from the remaining weight.

The recommended setting display area 41*t* is an area for displaying a recommended value with respect to the magnetic force of the lifting magnet 6. The recommended value with respect to the magnetic force of the lifting magnet 6 is, for example, the recommended value of voltage applied to the lifting magnet 6, the recommended value of electric current flowing through the lifting magnet 6, the recommended level of the magnetic force control dial 66, or the like. The main screen 41V illustrated in FIG. 4 encourages the operator to set a voltage to be applied to the lifting magnet 6 to 120 V after loading 900 kg scrap iron currently lifted by the lifting magnet 6 into the bed of a dump truck. Setting a voltage to be applied to the lifting magnet 6 to 120 V means, for example, setting the magnetic force control dial 66 to the second level. By setting the magnetic force control dial 66 to the second level after loading the 900 kg scrap iron into the bed of the dump truck, the operator can cause the lifting magnet 6 to attract and lift 500 kg scrap iron next time the lifting magnet 6 is magnetized. That is, the cumulative weight of scrap iron loaded into the bed of the dump truck can be made equal to the target weight (the maximum loading capacity) by the next loading work.

The operator may use the magnetic force control dial 66 to reduce the current weight, that is, to drop one or some of objects that have already been lifted by the lifting magnet 6.

The controller 30 derives the recommended value based on, for example, the relationship between the value of voltage applied to the lifting magnet 6 and the weight of scrap iron lifted by the lifting magnet 6 which has been obtained in past work. For example, when the same voltage value has been employed in the past multiple times of loading work, the controller 30 derives a voltage value that brings about a magnetic force (attraction force) necessary to lift the remaining weight based on the average of the weights lifted in the past multiple times of loading work.

The controller may not only display the recommended setting but also automatically adopt the recommended setting. That is, the controller 30 may control the magnetic force (attraction force) of the lifting magnet 6 without forcing the operator to operate the magnetic force control dial 66.

For example, the controller 30 determines the correspondence between the weight of scrap iron lifted by the lifting magnet 6 in the past and the output value (voltage value or current value) of the lifting magnet 6 at the time, and calculates the output value of the lifting magnet 6 of this time based on this correspondence and a weight to be lifted in the loading work of this time. Then, the controller 30 controls the magnetic force (attraction force) of the lifting magnet 6 based on the calculated output value without forcing the operator to operate the magnetic force control dial 66.

Figure 5:
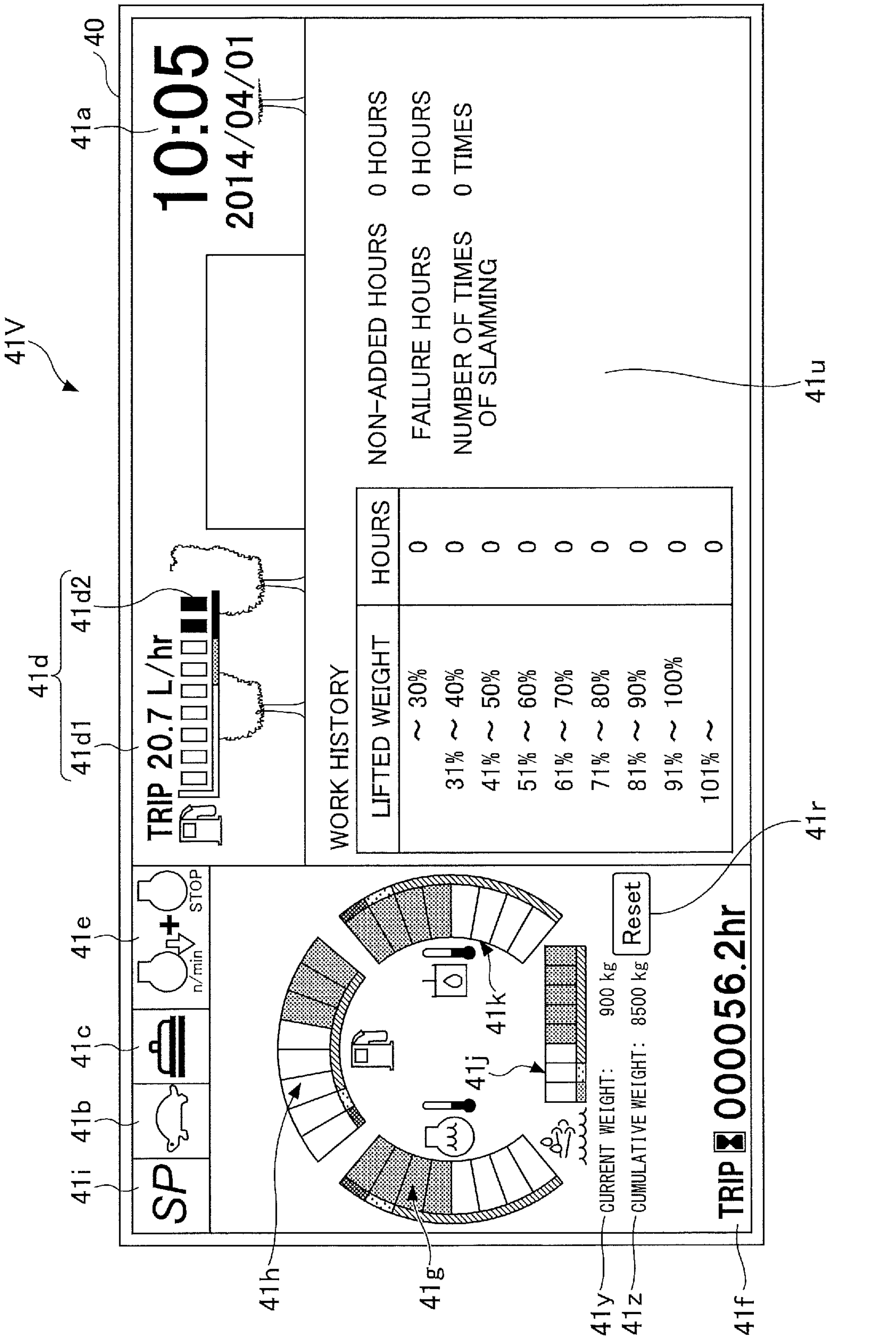
FIG. 5 is a diagram illustrating yet another example configuration of the main screen.

Next, yet another example configuration of the main screen 41V displayed on the display device 40 is described with reference to FIG. 5. The main screen 41V of FIG. 5 is different in including a work history display area 41*u* instead of the camera image display area 41*x* from, but otherwise equal to, the main screen 41V of FIG. 3. Therefore, a description of a common portion is omitted and differences are described in detail.

The work history display area 41*u* is an area for displaying the work history of the work machine 100. Examples of information displayed in the work history display area 41*u* include information on operating hours collected and counted by lifted weight, information on non-added hours, and information on the number of times of slamming. The operating hours are, for example, the operating hours of the engine 11.

FIG. 5 illustrates, as the information on operating hours collected and counted by lifted weight, operating hours when the current weight is less than or equal to 30% of the rated lifting capacity, operating hours when the current weight is more than or equal to 31% and less than or equal to 40% of the rated lifting capacity, and operating hours when the current weight is more than or equal to 101% of the rated lifting capacity. The controller 30 may collect and count the operating hours collected and counted by lifted weight further by swing radius or by operator. In the case of collecting and counting by operator, the work machine 100 may be equipped with a device for identifying operators, such as a camera or a contactless card reader.

The non-added hours are operating hours other than the operating hours collected and counted by lifted weight. According to this embodiment, the non-added hours do not include failure hours. The controller 30 collects and counts, for example, operating hours when the value of the calculated current weight is unstable as the non-added hours separately from the operating hours collected and counted by lifted weight. This is because the current weight may not be accurately calculated. For example, when the size of a variation in the current weight during a predetermined time (for example, a few seconds) is greater than a predetermined value, the controller 30 determines that the value of the current weight is unstable and collects and counts the period into the non-added hours.

The failure hours are operating hours when an information obtaining device is in failure. The controller 30 collects and counts, for example, operating hours when an information obtaining device (for example, the boom angle sensor S1) is in failure as the failure hours separately from the operating hours collected and counted by lifted weight and the non-added hours. This is because when an information obtaining device is in failure, the controller 30 cannot accurately calculate the current weight. For example, when the output of an information obtaining device is not within a predetermined allowable range, the controller 30 determines that the information obtaining device is in failure and collects and counts the period into the failure hours.

The number of times of slamming is the number of times the lifting magnet 6 is slammed onto an object to be lifted. The controller 30 determines whether the lifting magnet 6 has been slammed onto the object based on, for example, the outputs of the operating pressure sensor 29 and the pressure sensor S6*b*. The controller 30 increments the number of times of slamming only by one in response to determining that the lifting magnet 6 has been slammed onto the object.

According to the example of FIG. 5, the information displayed in the work history display area 41*u* is about the entire period after the shipment of the work machine 100. That is, the collecting and counting period is the entire period after the shipment of the work machine 100. The collecting and counting period, however, may also be configured in such a manner as to be changeable to, for example, the last one month, the last three months, and the last six months. For example, the controller 30 may be configured to change the collecting and counting period each time a predetermined button is operated.

Furthermore, the work history display area 41*u*, which is displayed on the right side in the main screen 41V as an area constituting part of the main screen 41V according to the example of FIG. 5, may also be displayed in full screen. Furthermore, the work history display area 41*u*, which displays the work history information in tabular form according to the example of FIG. 5, may also display the work history information using a bar chart, a pie chart, a line chart, or the like.

The controller 30 may transmit information displayed in the work history display area 41*u* to an external apparatus through a communications device. The external apparatus is, for example, a management apparatus installed in a management center or the like, or a portable terminal device such as a smartphone carried by a manager or the like.

This configuration enables the operator or the manager to check a work history indicating how the work machine 100 has been handled in the past at a desired time.

Figure 6:
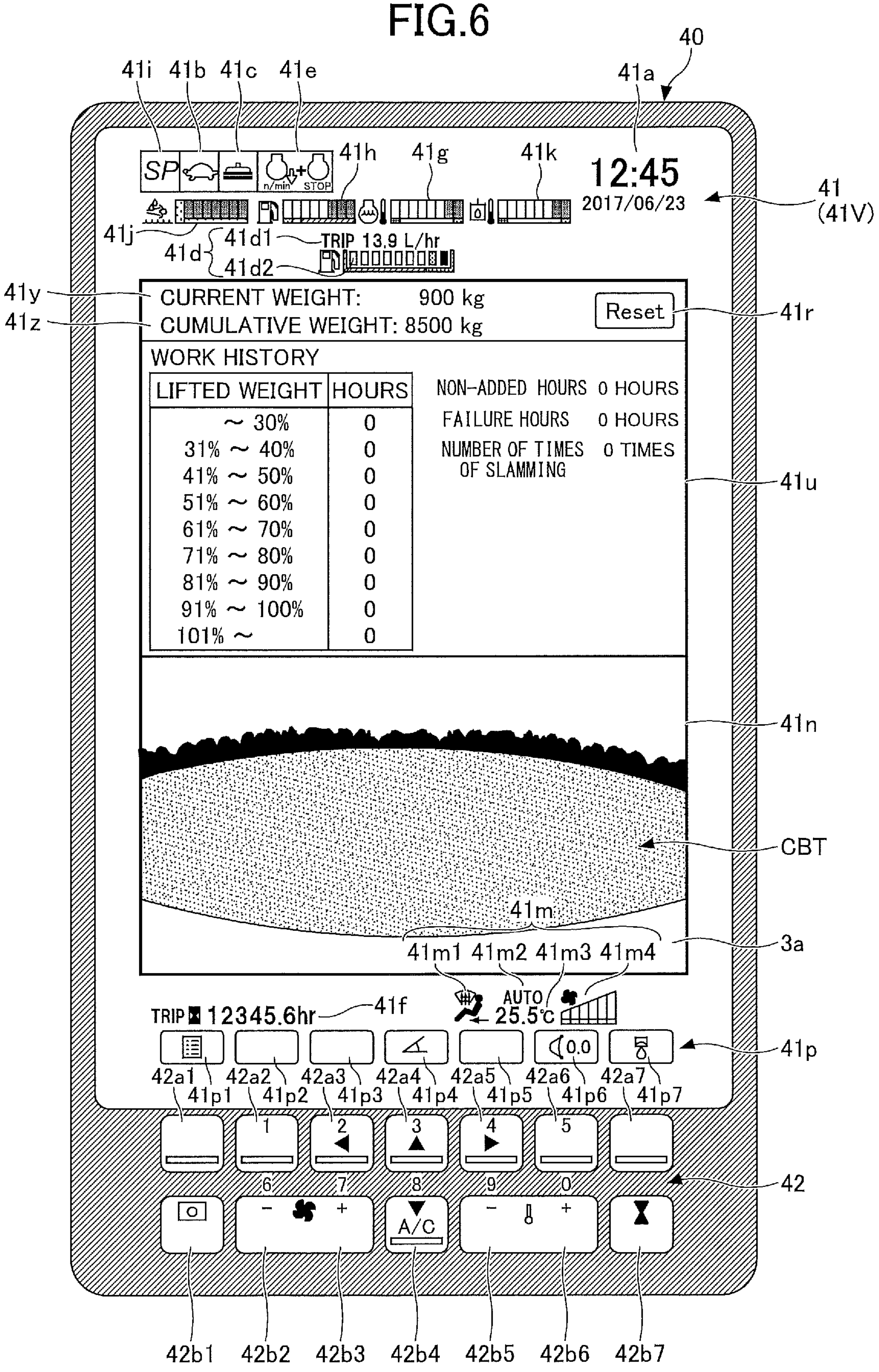
FIG. 6 is a diagram illustrating still another example configuration of the main screen.

Next, still another example configuration of the main screen 41V displayed on the display device 40 is described with reference to FIG. 6. The main screen 41V of FIG. 6 is mainly different in being displayed on the display device 40 having the vertically elongated image display part 41 from, but otherwise equal to, the main screen 41V of FIG. 5. Therefore, a description of a common portion is omitted and differences are described in detail.

According to the example illustrated in FIG. 6, the image display part 41 includes an air conditioner operating state display area 41*m*, an image display area 41*n*, and a menu display area 41*p* in addition to the date and time display area 41*a*, the travel mode display area 41*b*, the attachment display area 41*c*, the fuel efficiency display area 41*d*, the engine control status display area 41*e*, the engine operating time display area 41*f*, the coolant water temperature display area 41*g*, the remaining fuel amount display area 41*h*, the rotational speed mode display area 41*i*, the remaining aqueous urea solution amount display area 41*j*, the hydraulic oil temperature display area 41*k*, the reset button 41*r*, the work history display area 41*u*, the current weight display area 41*y*, and the cumulative weight display area 41*z*.

The air conditioner operating state display area 41*m* is an area for displaying information on the operating state of an air conditioner as settings information, and includes a vent display area 41*m*1 for displaying the position of a current vent, an operating mode display area 41*m*2 for displaying a current operating mode, a temperature display area 41*m*3 for displaying a current set temperature, and an air volume display area 41*m*4 for displaying a current set air volume.

The image display area 41*n* is an area for displaying various images. Examples of various images include an image captured by the image capturing device 80. According to the example illustrated in FIG. 6, a backward image CBT captured by the back camera 80B is displayed in the image display area 41*n*. The image display area 41*n* and the work history display area 41*u*, which are arranged vertically next to each other according to the example illustrated in FIG. 6, may be vertically spaced apart from each other.

The backward image CBT is an image showing a space behind the work machine 100 and includes the image 3*a* showing part of the upper surface of a counterweight. According to this embodiment, the backward image CBT is an actual viewpoint image generated by the display device 40, and is generated based on an image captured by the back camera 80B.

Instead of the backward image CBT, an overhead view image may be displayed in the image display area 41*n*. The overhead view image is a virtual viewpoint image generated by the display device 40, and is generated based on the respective captured images of the back camera 80B, the left camera 80L, and the right camera 80R. Furthermore, a work machine figure corresponding to the work machine 100 is centered in the overhead view image in order to cause the operator to intuitively understand the positional relationship between the work machine 100 and an object present in an area surrounding the work machine 100.

The image display part 41, which is vertically elongated according to the example illustrated in FIG. 6, may also be laterally elongated. When the image display part 41 is laterally elongated, the image display area 41*n* may be placed to the left of the work history display area 41*u* or may be placed to the right of the work history display area 41*u*. In this case, the image display area 41*n* and the work history display area 41*u* may be laterally spaced apart from each other.

The menu display area 41*p* includes tab areas 41*p*1 through 41*p*7. According to the example illustrated in FIG. 6, the tab areas 41*p*1 through 41*p*7 are laterally spaced apart from each other at the bottom of the image display part 41. An icon representing the contents of associated information is displayed in each of the tab areas 41*p*1 through 41*p*7.

In the tab area 41*p*1, a menu specific item icon for displaying menu specific items is displayed. When the operator selects the tab area 41*p*1, the icons displayed in the tab areas 41*p*2 through 41*p*7 switch to icons associated with the menu specific items.

In the tab area 41*p*4, an icon for displaying digital level-related information is displayed. When the operator selects the tab area 41*p*4, the backward image CBT switches to a first image showing the digital level-related information.

In the tab area 41*p*6, an icon for displaying intelligent construction-related information is displayed. When the operator selects the tab area 41*p*6, the backward image CBT switches to a second image showing the intelligent construction-related information.

In the tab area 41*p*7, an icon for displaying crane mode-related information is displayed. When the operator selects the tab area 41*p*7, the backward image CBT switches to a third image showing the crane mode-related information.

Any menu image such as the first image, the second image or the third image may be superimposed and displayed over the backward image CBT. Alternatively, the backward image CBT may be reduced to make room for displaying a menu image.

No icons are displayed in the tab areas 41*p*2, 41*p*3, and 41*p*5. Therefore, even when the operator operates the tab area 41*p*2, 41*p*3, or 41*p*5, the image displayed on the image display part 41 does not change.

The icons displayed in the tab areas 41*p*1 through 41*p*7 are not limited to the above-described examples, and icons for showing other information may also be displayed.

According to the example illustrated in FIG. 6, the operation part 42 is composed of multiple button switches for the operator making a selection from among the tab areas 41*p*1 through 41*p*7, inputting settings, etc. Specifically, the operation part 42 includes seven switches 42*a*1 through 42*a*7 placed in the upper row and seven switches 42*b*1 through 42*b*7 placed in the lower row. The switches 42*b*1 through 42*b*7 are placed below the switches 42*a*1 through 42*a*7, respectively. The number, form, and arrangement of switches of the operation part 42, however, are not limited to the above-described example. For example, like a jog wheel, a jog switch or the like, the operation part 42 may be a single unit into which the functions of multiple button switches are integrated. The operation part 42 may also be configured as a member independent of the display device 40. Furthermore, the tab areas 41*p*1 through 41*p*7 may be configured as software buttons. In this case, the operator can select desired tab areas by touching the tab areas 41*p*1 through 41*p*7.

According to the example illustrated in FIG. 6, the switch 42*a*1 is placed below the tab area 41*p*1 to correspond to the tab area 41*p*1, and functions as a switch for selecting the tab area 41*p*1. The same is the case with each of the switches 42*a*2 through 42*a*7.

This configuration enables the operator to intuitively determine which of the switches 42*a*1 through 42*a*7 to operate to select a desired one of the tab areas 41*p*1 through 41*p*7.

The switch 42*b*1 is a switch for switching captured images displayed in the image display area 41*n*. A captured image means an image captured by the image capturing device 80. The display device 40 is configured such that the captured image displayed in the image display area 41*n* switches between, for example, the backward image CBT, a leftward image captured by the left camera 80L, and a rightward image captured by the right camera 80R each time the switch 42*b*1 is operated. Alternatively, the display device 40 may be configured such that the image display area 41*n* and the work history display area 41*u* replace each other each time the switch 42*b*1 is operated.

Thus, the operator may switch images displayed in the image display area 41*n* by operating the switch 42*b*1 serving as the operation part 42. Alternatively, the operator may switch between the image display area 41*n* and the work history display area 41*u* by operating the switch 42*b*1.

The switches 42*b*2 and 42*b*3 are switches for controlling the air volume of an air conditioner. According to the example illustrated in FIG. 6, the operation part 42 is configured such that the switch 42*b*2 is operated to decrease the air volume of the air conditioner and the switch 42*b*3 is operated to increase the air volume of the air conditioner.

The switch 42*b*4 is a switch for turning ON and OFF a cooling/heating function. According to the example illustrated in FIG. 6, the operation part 42 is configured such that each time the switch 42*b*4 is operated, the cooling/heating function is switched between ON and OFF.

The switches 42*b*5 and 42*b*6 are switches for controlling the set temperature of the air conditioner. According to the example illustrated in FIG. 6, the operation part 42 is configured such that the switch 42*b*5 is operated to decrease the set temperature and the switch 42*b*6 is operated to increase the set temperature.

The switch 42*b*7 is a switch for changing the contents of information on the operating time of the engine 11 displayed in the engine operating time display area 41*f*. The information on the operating time of the engine 11 includes, for example, a cumulative operating time associated with the entire period and a cumulative operating time associated with a partial period.

Furthermore, each of the switches 42*a*2 through 42*a*6 and 42*b*2 through 42*b*6 is configured to be able to input a number shown on or near the switch. Furthermore, the switches 42*a*3, 42*a*4, 42*a*5, and 42*b*4 are configured to be able to move a cursor left, up, right, and down, respectively, when the cursor is displayed on the image display part 41.

The functions assigned to the switches 42*a*1 through 42*a*7 and 42*b*1 through 42*b*7 are examples, and the switches 42*a*1 through 42*a*7 and 42*b*1 through 42*b*7 may be configured to be able to execute other functions.

Figure 7:
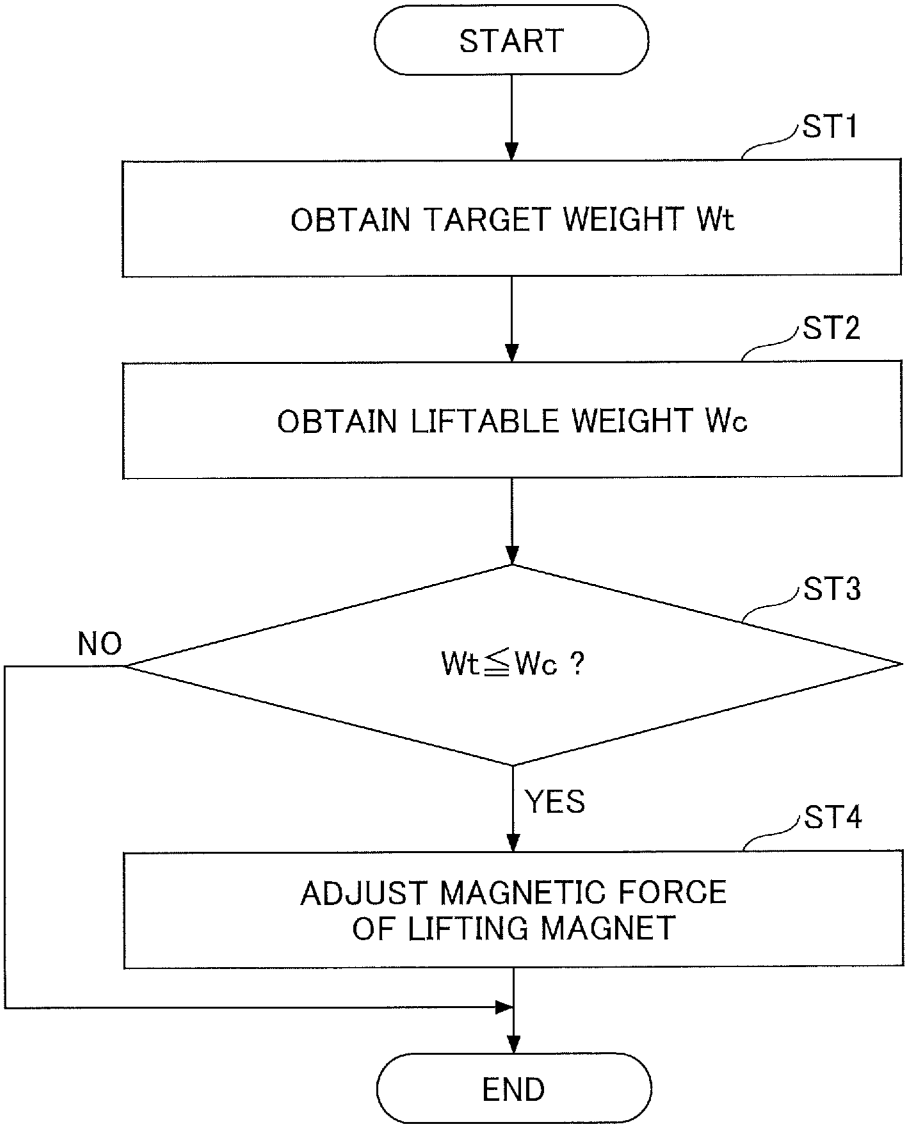
FIG. 7 is a flowchart of a magnetic force adjusting process.

Next, a process of the controller 30 adjusting the magnetic force (attraction force) of the lifting magnet 6 (hereinafter "magnetic force adjusting process") is described with reference to FIG. 7. FIG. 7 is a flowchart of an example of the magnetic force adjusting process. The controller 30 executes this magnetic force adjusting process each time the weak magnetization button 65A is pressed, for example.

In the case of performing the work of loading an object such as scrap iron into the bed of a dump truck, the operator of the work machine 100, for example, causes the lifting magnet 6 to be in the weak attraction state by pressing the weak magnetization button 65A and causes the lifting magnet 6 to attract the scrap iron. Then, for example, after lifting the lifting magnet 6 through a boom raising operation, the operator presses the strong magnetization button 65B to cause the lifting magnet 6 to be in the strong attraction state. This is for controlling the magnetic force to prevent the object such as scrap iron from being shook off the lifting magnet 6 during the movement of the lifting magnet 6 due to a subsequent attachment operation or swing operation. Thereafter, the operator moves the lifting magnet 6 to directly above a desired location through an attachment operation or a swing operation. When the lifting magnet 6 is moved to directly above the desired location, the operator may press the release button 65C to cause the lifting magnet 6 to be in the releasing state to drop the scrap iron attracted to the lifting magnet 6 onto the desired location.

First, the controller 30 obtains a target weight Wt (step ST1). According to this embodiment, the controller 30 obtains the weight of an object to be lifted by the magnetization of the lifting magnet 6 of this time. Specifically, the controller 30 obtains the maximum loading capacity of a dump truck and the cumulative weight that is the weight of the object that has been loaded into the dump truck. Then, the controller 30 calculates the remaining weight as the target weight Wt by subtracting the cumulative weight from the maximum loading capacity.

Thereafter, the controller obtains a liftable weight Wc (step ST2). According to this embodiment, the controller 30 reads the liftable weight Wc stored in the nonvolatile storage. In this case, the liftable weight Wc is, for example, the weight of an object that can be lifted when the maximum allowable voltage is applied to the lifting magnet 6. The liftable weight Wc, however, may also be the weight of an object that can be lifted when a current set voltage is applied to the lifting magnet 6. The current set voltage is, for example, a voltage set by the magnetic force control dial 66. The controller 30 may calculate the liftable weight Wc based on the results of the last one or more liftings. The results of the liftings include, for example, the relationship between supplied power (supplied current or supplied voltage) and the weight of an actually lifted object.

Thereafter, the controller 30 determines whether the target weight Wt is smaller than or equal to the liftable weight Wc (step ST3). That is, the controller 30 determines whether an object of the target weight Wt can be lifted by the magnetization of the lifting magnet 6 of this time.

In response to determining that the target weight Wt is greater than the liftable weight Wc (NO at step ST3), the controller 30 ends the magnetic force adjusting process of this time without adjusting the magnetic force (attraction force) of the lifting magnet 6.

In response to determining that the target weight Wt is smaller than or equal to the liftable weight Wc (YES at step ST3), the controller 30 adjusts the magnetic force (attraction force) of the lifting magnet 6 (step ST4). According to this embodiment, the controller 30 adjusts the magnetic force (attraction force) of the lifting magnet 6 so that the liftable weight Wc, which is greater than or equal to the target weight Wt, becomes equal to the target weight Wt. Specifically, when the object of the target weight Wt is lifted by adopting a voltage higher than the current set voltage, the controller changes the current set voltage to the higher voltage. When the object of the target weight Wt is lifted by adopting a voltage lower than the current set voltage, the controller changes the current set voltage to the lower voltage.

For example, it is assumed that the work of loading 1200 kg scrap iron per time is performed multiple times during the work of loading scrap iron into a dump truck whose maximum loading capacity is 10,000 kg. Furthermore, it is assumed that the set voltage used in this work is 150 V.

When the loading work is repeated seven times and the weak magnetization button 65A is thereafter pressed for the eighth loading, the controller 30 calculates the target weight Wt at 1600 kg, which is the value obtained by subtracting the cumulative weight of 8400 kg (=1200 kg×7) from the maximum loading capacity of 10,000 kg. Furthermore, the controller 30 calculates 1200 kg, which is the average lifted weight of the past seven times, as the liftable weight Wc. In this case, the controller 30 determines that the target weight Wt is greater than the liftable weight Wc, and causes 1200 kg scrap iron to be lifted with the same set voltage as before and loaded into the bed of the dump truck without adjusting the magnetic force (attraction force) of the lifting magnet 6. This is because it may be determined that the target weight cannot be achieved by the magnetization of this time.

Thereafter, when the weak magnetization button 65A is pressed for the ninth loading, the controller 30 calculates the target weight Wt at 400 kg, which is the value obtained by subtracting the cumulative weight of 9600 kg (=1200 kg×8) from the maximum loading capacity of 10,000 kg. Furthermore, the controller 30 calculates 1200 kg, which is the average lifted weight of the past eight times with a set voltage of 150 V, as the liftable weight Wc. In this case, if the set voltage remains unchanged at 150 V when the weak magnetization button 65A is pressed, the work machine 100 lifts scrap iron of an excessive weight greater than the target weight Wt. Therefore, the controller 30 determines that the target weight Wt is smaller than the liftable weight Wc and adjusts the magnetic force (attraction force) of the lifting magnet 6. Specifically, the set voltage, which has been 150 V, is reduced to a voltage suitable for lifting scrap iron of 400 kg that is the target weight Wt (for example, 50 V).

For example, the controller 30 determines the correspondence between the weight of scrap iron lifted by the lifting magnet 6 in the past and the output value (voltage value, current value, or the like) of the lifting magnet 6 at the time, and calculates the set value that is the output value of the lifting magnet 6 of this time based on this correspondence and a weight to be lifted in the loading work of this time. Then, the controller 30 adjusts the magnetic force (attraction force) of the lifting magnet 6 by changing a current set voltage to the calculated set voltage.

As a result, the 400 kg scrap iron is lifted and loaded into the bed of the dump truck by the lifting magnet 6, so that the weight of scrap iron loaded into the bed of the dump truck totals to 10,000 kg, which is equal to the maximum loading capacity.

Thus, the work machine 100 can lift an object of the target weight Wt with the magnetization of the lifting magnet 6 that is neither excessive nor insufficient.

As described above, the work machine 100 according to an embodiment of the present invention includes a lower traveling structure 1, an upper swing structure 3 mounted on the lower traveling structure 1 via the swing mechanism 2, the working attachment attached to the upper swing structure 3, the lifting magnet 6 attached to the working attachment, the controller 30 serving as a control device that calculates the weight of an object lifted by the lifting magnet 6, and the display device 40 that displays the weight of the object calculated by the controller 30. With this configuration, the work machine 100 enables the operator to know the weight of an object lifted using the lifting magnet 6.

The display device 40 may be configured to display information on operating time collected and counted by object weight. For example, as illustrated in FIG. 5, the display device 40 may be configured to display information on operating hours collected and counted by the weight of an object lifted by single magnetization. By looking at this information, the operator or a manager can understand how the work machine 100 has been used.

The display device 40 may also be configured to display the cumulative value of the weights of objects. For example, as illustrated in FIG. 3, the display device 40 may be configured to display the cumulative value of the weights of objects lifted by multiple times of magnetization. The cumulative value may be reset each time loading into a single dump truck is completed or may be reset each time a day's work is completed. This configuration, for example, enables the operator to know the weight of an object loaded into the bed of each dump truck or to understand a day's workload in the form of the weight of a lifted object.

Figure 8:
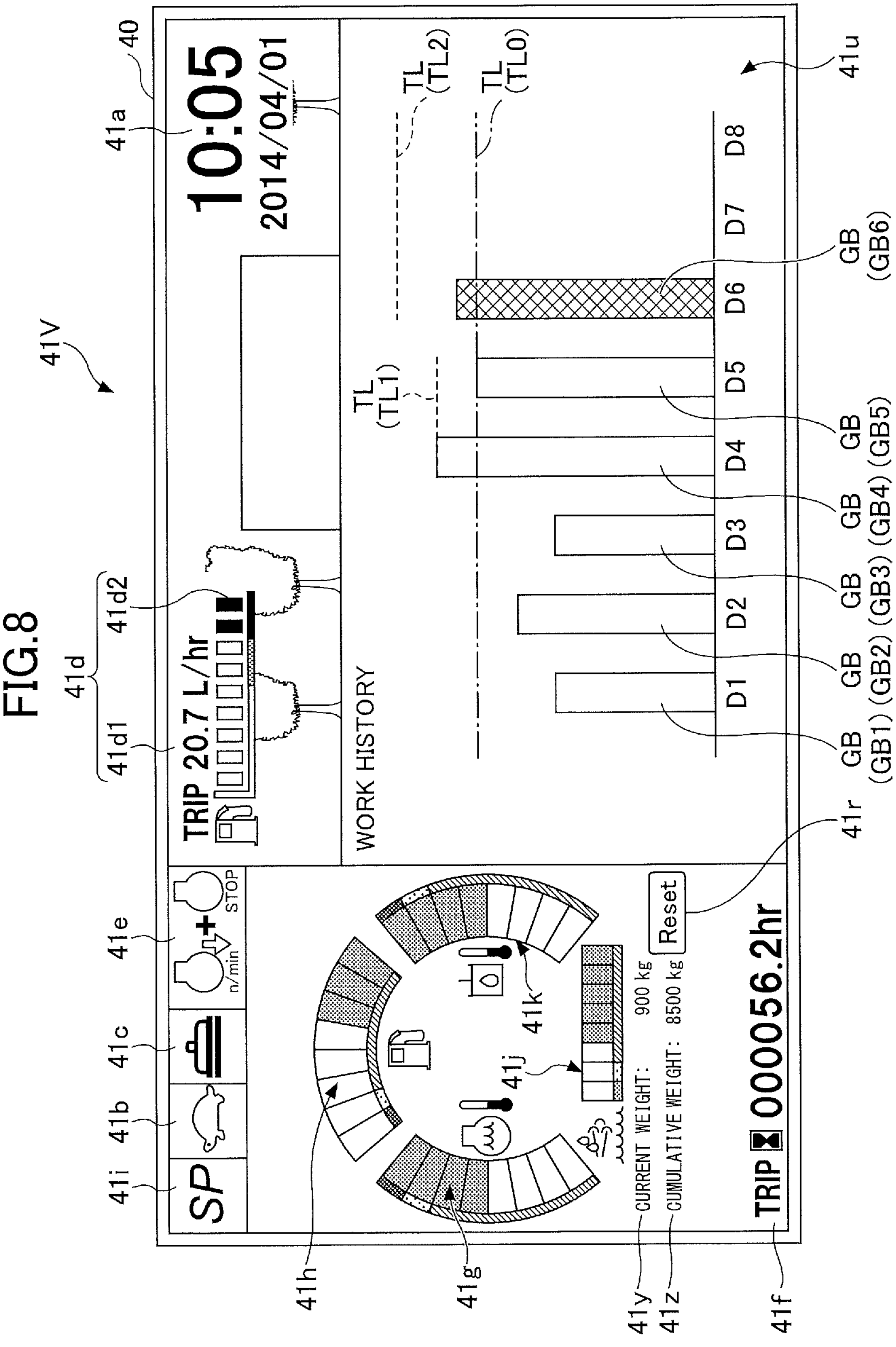
FIG. 8 is a diagram illustrating even another example configuration of the main screen.

FIG. 8 illustrates a main screen including the work history display area 41*u* that shows the transition of an everyday workload as a work history of the work machine 100.

The work history display area 41*u* illustrated in FIG. 8 shows a work history associated with the work of loading scrap iron that is performed for eight days. Specifically, the work history display area 41*u* illustrated in FIG. 8 includes a target line TL that represents a target weight that is the total weight of scrap iron to be loaded into the bed of a dump truck by the work of each day and a bar image GB that represents an actual weight that is the total weight of scrap iron actually loaded into the bend of a dump truck by the work of each day.

More specifically, the work history display area 41*u* of FIG. 8 shows that the work of five days in the eight-days schedule has been finished and the sixth day's work is currently under way. The work history display area 41*u* of FIG. 8 displays a bar image GB6 that represents the actual weight that is the total weight of scrap iron that has been actually loaded into the bed of a dump truck by the sixth day's work that is currently under way differently from each of bar images GB1 through GB5 that represent the actual weight that is the total weight of scrap iron actually loaded into the bed of a dump truck by the work of the first day through the fifth day that is work that has already been completed.

Furthermore, the work history display area 41*u* of FIG. 8 displays the target line Tl including target lines TO0, TL1, and TL2. The target line TL0 represents an initial target weight set before the start of the first day's work. The target line Tl1 represents a target weight corrected based on the result of the three days' work after the completion of the third day's work. The example illustrated in FIG. 8 shows that the target weight is increased because the actual weight fails to reach the target weight in each of the first day's work through the third day's work. The target line TL2 represents a target weight corrected again based on the result of the five days' work after the completion of the fifth day's work. The example illustrated in FIG. 8 shows that the corrected target weight is again increased because the actual weight fails to reach the corrected target weight after the fifth day's work.

By looking at this work history display area 41*u*, the operator of the work machine 100 can easily understand that there is a delay in the eight-day loading work of scrap iron. Furthermore, the operator can easily understand the size of the delay and a workload or the like necessary to make up for the delay.

The work machine 100 may include a reset part that resets the cumulative value. The reset part may be, for example, a switch, and specifically, may be the reset button 41*r* in the form of a software button as illustrated in FIG. 3. This configuration enables the operator to reset the cumulative value at a desired time.

The weight of the object lifted using the lifting magnet 6 may be integrated for a preset period. The preset period may be either a continuous period or an intermittent period. Furthermore, the preset period may include both a period where the integration is performed and a period where the integration is not performed. This configuration enables the manager to be aware of, for example, a cumulative weight on a daily basis, a cumulative weight on a work site basis, a cumulative weight on an operator basis, etc.

The controller 30 may be configured to control the attraction force of the lifting magnet 6. Specifically, as illustrated in the flowchart of FIG. 7, the controller 30 may be configured to automatically limit the weight of an object that can be lifted with one time of magnetization. This configuration makes it possible for the controller 30 to, for example, prevent an object that exceeds the maximum loading capacity of a dump truck from being loaded into its bed.

An embodiment of the present invention is described in detail above. The present invention, however, is not limited to the above-described embodiment. Various variations and substitutions may be applied to the above-described embodiment without departing from the scope of the present invention. Furthermore, the separately described features may be combined to the extent that no technical contradiction is caused.

For example, according to the above-described embodiment, a hydraulic operation system including a hydraulic pilot circuit is disclosed. For example, in a hydraulic pilot circuit associated with the left operating lever 26L, hydraulic oil supplied from the pilot pump 15 to the left operating lever 26L is conveyed to a pilot port of a corresponding flow control valve at a flow rate commensurate with the degree of opening of a remote control valve opened or closed by the tilt of the left operating lever 26L in an arm lowering direction. In a hydraulic pilot circuit associated with the right operating lever 26R, hydraulic oil supplied from the pilot pump 15 to the right operating lever 26R is conveyed to a pilot port of a corresponding flow control valve at a flow rate commensurate with the degree of opening of a remote control valve opened or closed by the tilt of the right operating lever 26R in a boom raising direction.

Instead of a hydraulic operation system including such a hydraulic pilot circuit, however, an electric operation system including an electric pilot circuit may be adopted. In this case, the amount of lever operation of an electric operating lever in the electric operation system is input to the controller 30 as an electrical signal, for example. Furthermore, a solenoid valve is placed between the pilot pump 15 and a pilot port of each flow control valve. The solenoid valve is configured to operate in response to an electrical signal from the controller 30. According to this configuration, when a manual operation using the electric operating lever is performed, the controller 30 can move each flow control valve by increasing or decreasing a pilot pressure by controlling the solenoid valve with an electrical signal commensurate with the amount of lever operation. Each flow control valve may be constituted of a solenoid spool valve. In this case, the solenoid spool valve operates in response to an electrical signal from the controller 30 commensurate with the amount of lever operation of the electric operating lever.

When an electric operation system including an electric operating lever is adopted, the controller 30 can more easily execute an autonomous control function than in the case where a hydraulic operation system including a hydraulic operating lever is adopted. The autonomous control function is a function for causing the work machine 100 to autonomously operate, and includes, for example, a function to cause hydraulic actuators, the lifting magnet 6, etc., to autonomously operate independent of the details of the operator's operation on the operating device 26, the lifting magnet switch 65, etc.

Figure 9:
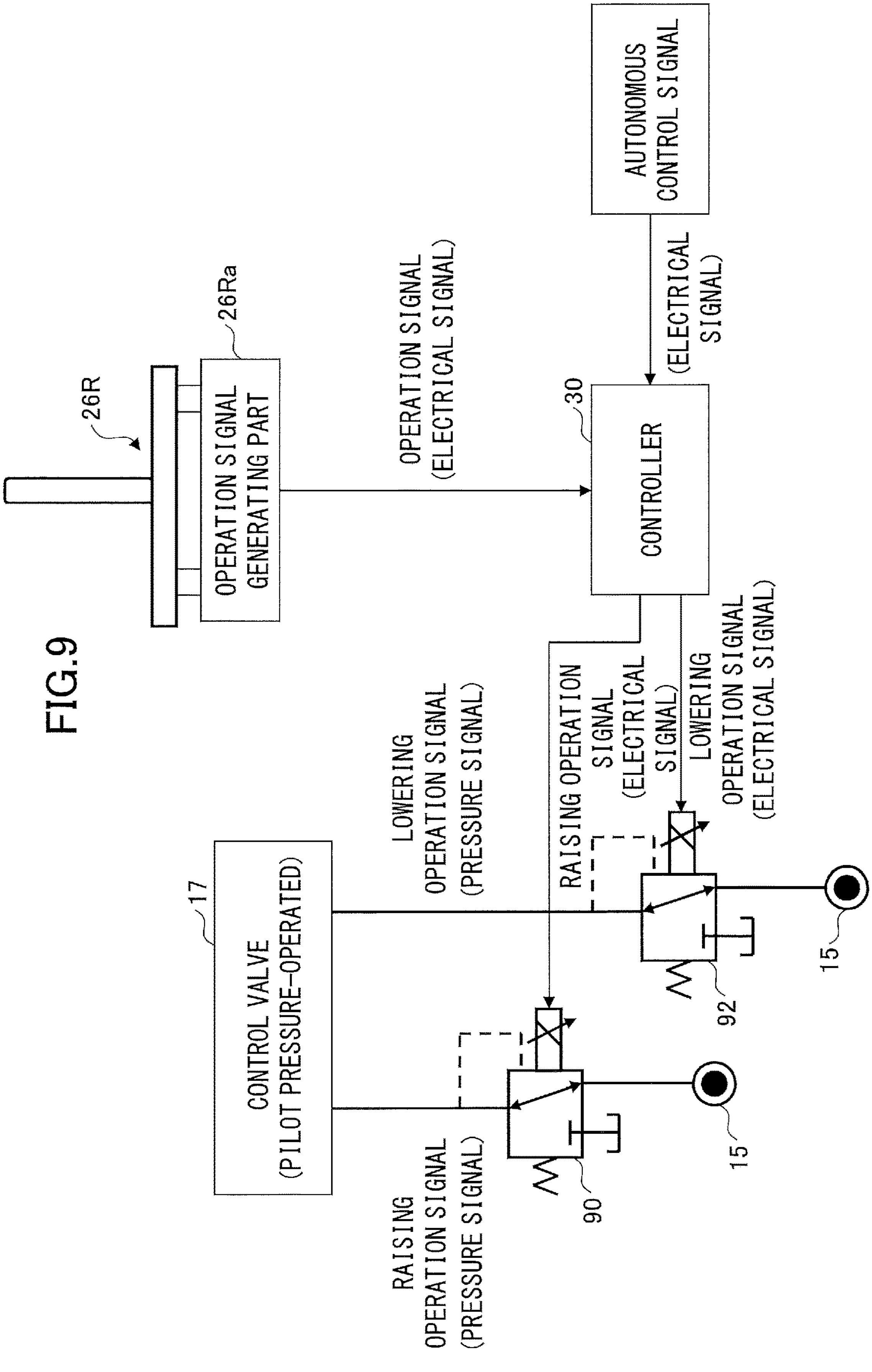
FIG. 9 is a diagram illustrating an example configuration of an electric operation system.

FIG. 9 illustrates an example configuration of an electric operation system. Specifically, the electric operation system of FIG. 9 is an example of a boom operation system for driving the boom cylinder 7, and is constituted mainly of the pilot pressure-operated control valve unit 17, the right operating lever 26R serving as an electric operating lever, the controller 30, a solenoid valve 90 for raising operation, and a solenoid valve 92 for lowering operation. The electric operation system of FIG. 9 may also be likewise applied to a swing operation system for swinging the upper swing structure 3, a boom operation system for raising and lowering the boom 4, an arm operation system for opening and closing the arm 5, a lifting magnet operation system for magnetizing and demagnetizing the lifting magnet 6, etc.

The pilot pressure-operated control valve unit 17 includes a flow control valve associated with the left travel hydraulic motor 1L, a flow control valve associated with the right travel hydraulic motor 1R, a flow control valve associated with the swing hydraulic motor 2A, a flow control valve associated with the boom cylinder 7, a flow control valve associated with the aim cylinder 8, a flow control valve associated with the lifting magnet cylinder 9, etc. The solenoid valve 90 is configured to be able to control the pressure of hydraulic oil in a conduit connecting the pilot pump 15 and the raising-side pilot port of the flow control valve associated with the boom cylinder 7. The solenoid valve 92 is configured to be able to control the pressure of hydraulic oil in a conduit connecting the pilot pump 15 and the lowering-side pilot port of the flow control valve associated with the boom cylinder 7.

When a manual operation is performed, the controller 30 generates a raising operation signal (electrical signal) or a lowering operation signal (electrical signal) in accordance with an operation signal (electrical signal) output by an operation signal generating part 26Ra of the right operating lever 26R. The operation signal output by the operation signal generating part 26Ra of the right operating lever 26R is an electrical signal that changes in accordance with the amount of operation and the direction of operation of the right operating lever 26R.

Specifically, when the right operating lever 26R is operated in the raising direction, the controller 30 outputs a raising operation signal (electrical signal) commensurate with the amount of lever operation to the solenoid valve 90. The solenoid valve 90 operates in accordance with the raising operation signal (electrical signal) to control a pilot pressure serving as a raising operation signal (pressure signal) that acts on the raising-side pilot port of the flow control valve associated with the boom cylinder 7. Likewise, when the right operating lever 26R is operated in the lowering direction, the controller 30 outputs a lowering operation signal (electrical signal) commensurate with the amount of lever operation to the solenoid valve 92. The solenoid valve 92 operates in accordance with the lowering operation signal (electrical signal) to control a pilot pressure serving as a lowering operation signal (pressure signal) that acts on the lowering-side pilot port of the flow control valve associated with the boom cylinder 7.

In the case of executing autonomous control, the controller 30, for example, generates a raising operation signal (electrical signal) or a lowering operation signal (electrical signal) in accordance with an autonomous control signal (electrical signal) instead of responding to the operation signal (electrical signal) output by the operation signal generating part 26Ra of the right operating lever 26R. The autonomous control signal may be either an electrical signal generated by the controller 30 or an electrical signal generated by a control device other than the controller 30.

Figure 10:
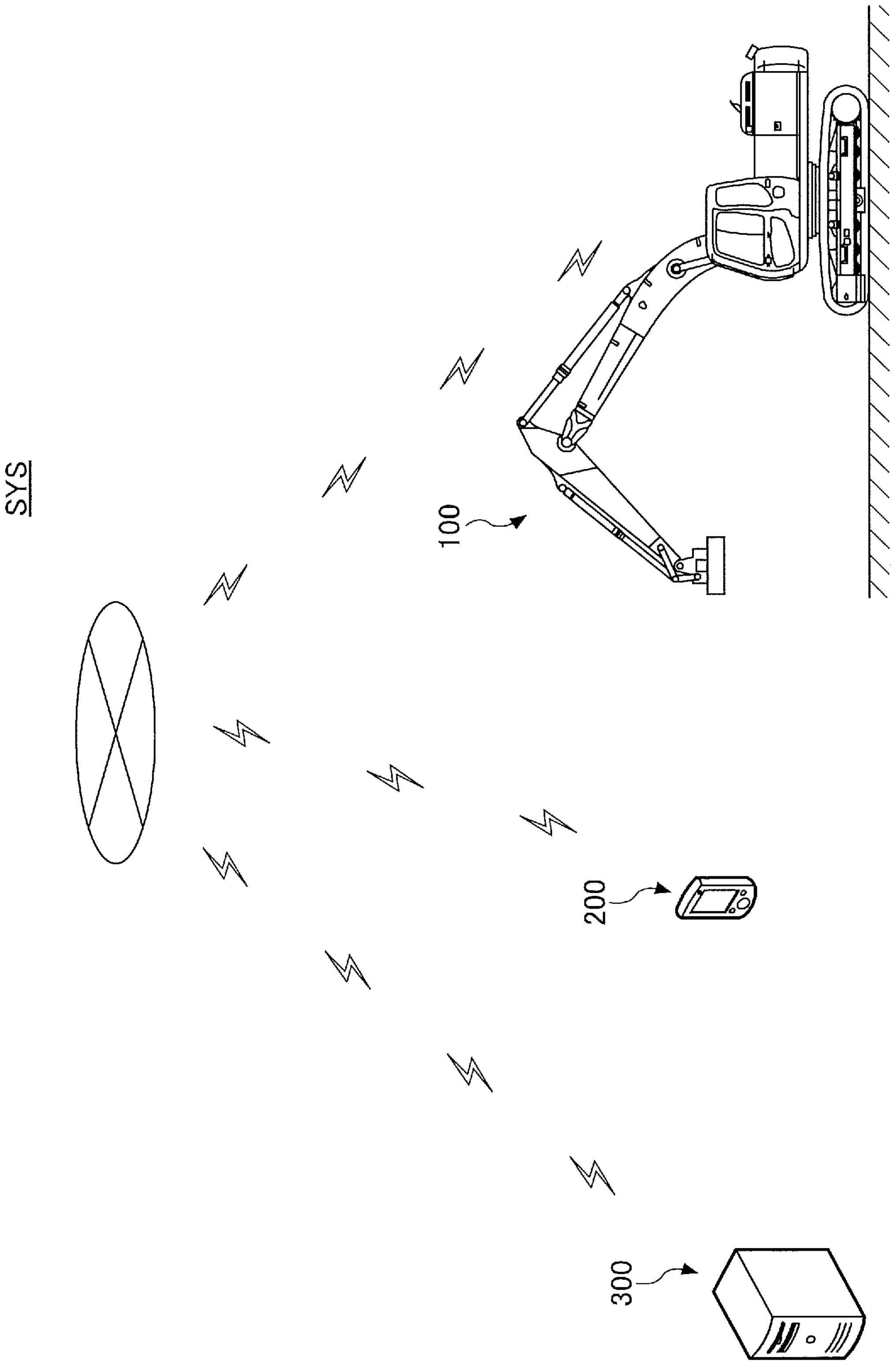
FIG. 10 is a schematic diagram illustrating an example configuration of a work machine management system.

Information obtained by the work machine 100 may be shared with a manager, other work machine operators, etc., through a work machine management system SYS as illustrated in FIG. 10. FIG. 10 is a schematic diagram illustrating an example configuration of the work machine management system SYS. The management system SYS is a system that manages one or more work machines 100. According to this embodiment, the management system SYS is constituted mainly of the work machine 100, an assist device 200, and a management apparatus 300. Each of the work machine 100, the assist device 200, and the management apparatus 300 constituting the management system SYS may be one or more in number. According to the example of FIG. 10, the management system SYS includes the single work machine 100, the single assist device 200, and the single management apparatus 300.

The assist device 200 is typically a portable terminal device, and is, for example, a notebook PC, a tablet PC, or a smartphone carried by a worker or the like at a construction site. The assist device 200 may also be a portable terminal device carried by the operator of the work machine 100. The assist device 200 may also be a stationary terminal device.

The management apparatus 300 is typically a stationary terminal device, and is, for example, a server computer installed in a management center or the like outside a construction site. The management apparatus 300 may also be a portable computer (for example, a portable terminal device such as a notebook PC, a tablet PC, or a smartphone).

At least one of the assist device 200 and the management apparatus 300 may include a monitor and an operating device for remote control. In this case, the operator may operate the work machine 100 using the operating device for remote control. The operating device for remote control is connected to the controller 30 installed in the work machine 100 through, for example, a radio communications network such as a short-range radio communications network, a cellular phone network, or a satellite communications network.

Furthermore, the main screen 41V illustrated in FIGS. 5, 6 and 8 is typically displayed on the display device 40 installed in the cabin 10, but may also be displayed on a display device connected to at least one of the assist device 200 and the management apparatus 300. This is for enabling a worker using the assist device 200 or a manager using the management apparatus 300 to visually check information on the work history of the work machine 100.

According to the management system SYS of the work machine 100 as described above, the controller 30 of the work machine 100 may transmit information on the time, location, etc., of operation of the lifting magnet switch 65 to at least one of the assist device 200 and the management apparatus 300. At this point, the controller 30 may also transmit at least one of the output of the object detector, an image captured by the image capturing device 80, etc., to at least one of the assist device 200 and the management apparatus 300. The image may be multiple images captured during the magnetization of the lifting magnet 6. Furthermore, the controller 30 may also transmit information on at least one of data on the operation details of the work machine 100, data on the pose of the work machine 100, data on the pose of the working attachment, etc., during the magnetization of the lifting magnet 6 to at least one of the assist device 200 and the management apparatus 300. This is for enabling a worker using the assist device 200 or a manager using the management apparatus 300 to access information on the work machine 100 during the magnetization of the lifting magnet 6.

Thus, the management system SYS of the work machine 100 according to the embodiment of the present invention allows information on the work machine 100 obtained during the magnetization of the lifting magnet 6 to be shared with a manager, other work machine operators, etc.

What is claimed is:

1. A work machine comprising:

a lower traveling structure;

an upper swing structure mounted on the lower traveling structure via a swing mechanism;

an attachment attached to the upper swing structure;

a lifting magnet attached to the attachment; and a hardware processor configured to calculate a weight of an object lifted by the lifting magnet;

simultaneously display the calculated weight of the object and an image captured by an image capturing device on a display; and calculate a remaining weight as a target weight by subtracting a cumulative value of the weight of the object from a maximum loading capacity of a dump truck and control an attraction force of the lifting magnet based on the target weight.

2. The work machine as claimed in claim 1, wherein the hardware processor is configured to display information on operating time collected and counted by the weight of the object on the display.

3. The work machine as claimed in claim 1, wherein the hardware processor is configured to display the cumulative value of the weight of the object and a rightward image captured by the image capturing device, the rightward image showing a space to a right of the work machine.

4. The work machine as claimed in claim 3, further comprising:

a switch configured to reset the cumulative value.

5. The work machine as claimed in claim 1, wherein the weight of the object is accumulated for a preset period.

6. The work machine as claimed in claim 1, wherein the hardware processor is configured to determine a correspondence between the weight of the object lifted by the lifting magnet and an output value of the lifting magnet.

7. The work machine as claimed in claim 1, wherein the hardware processor is configured to simultaneously display the calculated weight of the object and the image captured by the image capturing device on each of the display and another display.

8. The work machine as claimed in claim 1, wherein the hardware processor is configured to determine whether an excessively heavy object remains lifted when lifting of the object by the lifting magnet is completed.

* * * * *